Dec. 17, 1963  J. E. BUXTON ETAL  3,114,270
STARTER DRIVE
Filed May 5, 1961  3 Sheets-Sheet 1
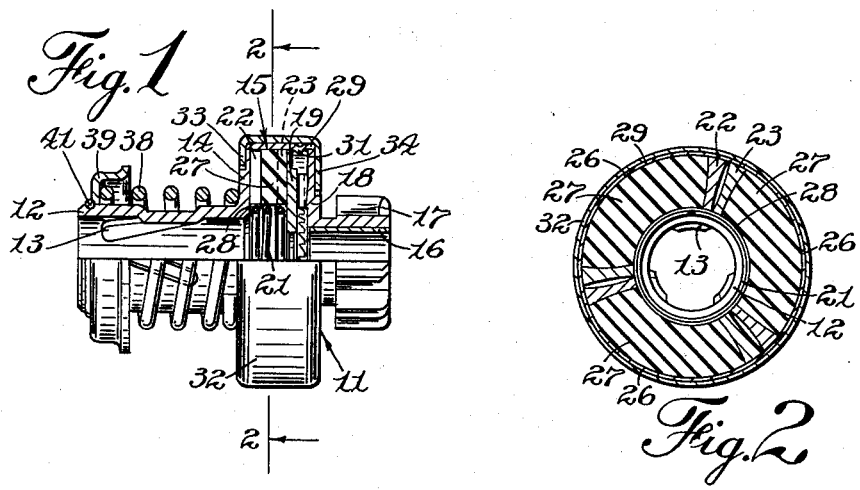
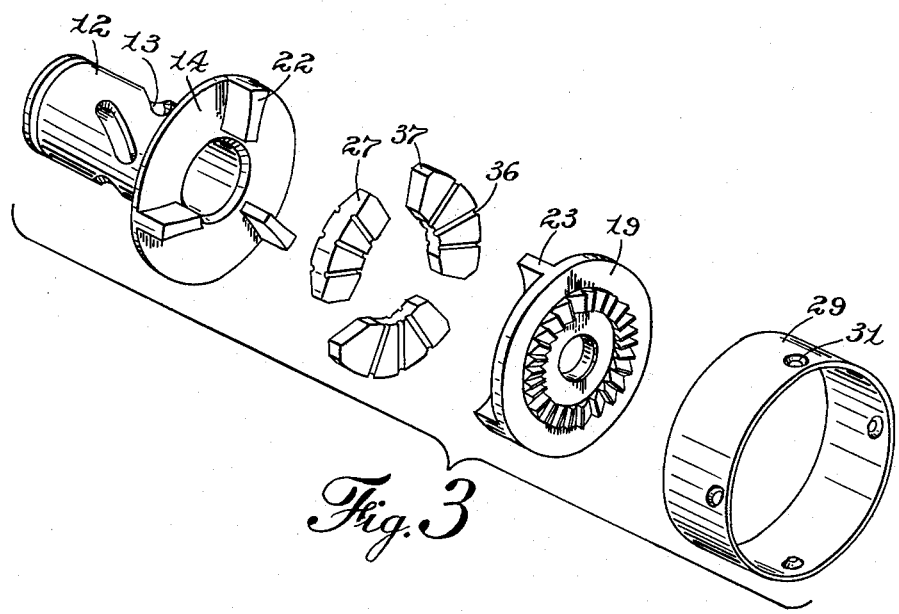
WITNESS:
Esther M. Stockton
INVENTORS
James E. Buxton
John S. Sabatini
BY Edwin Elliott Hood
John Phillips Ryan
ATTORNEY

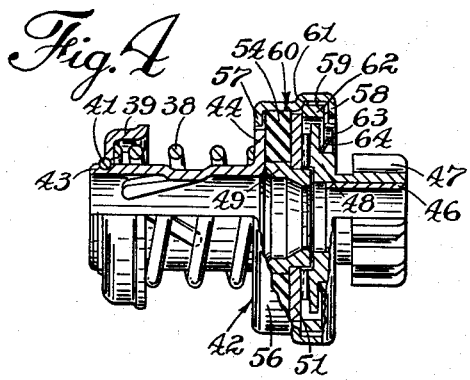
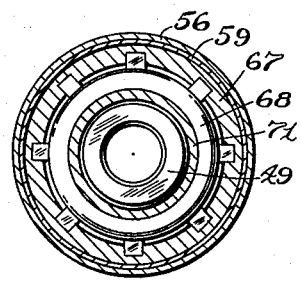
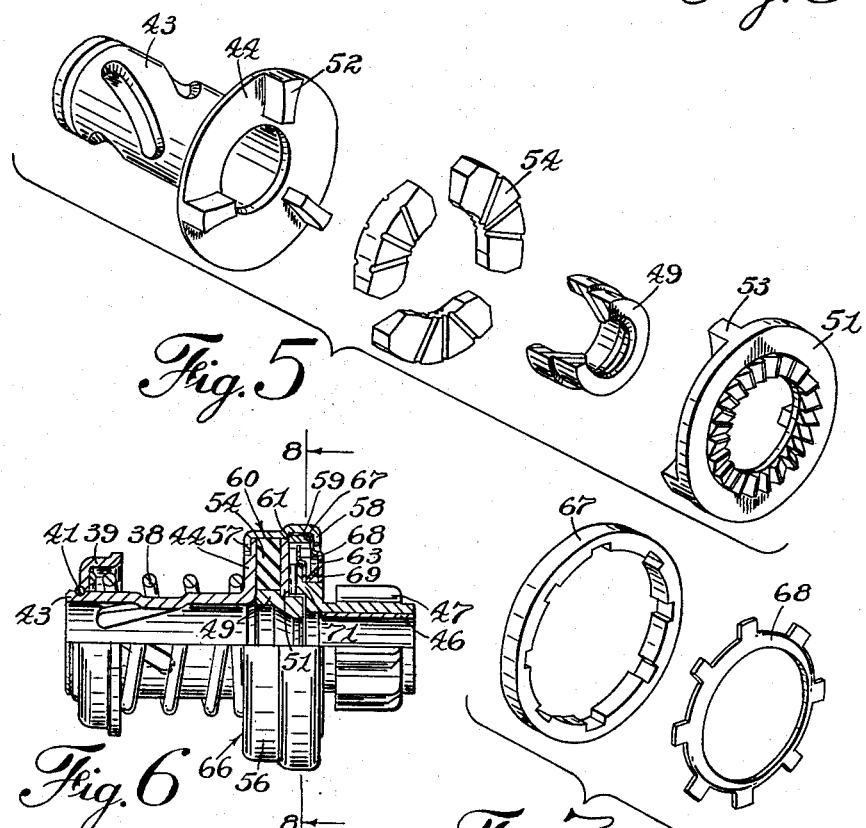
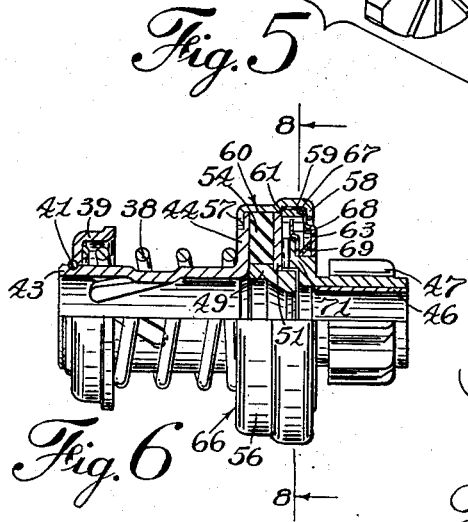
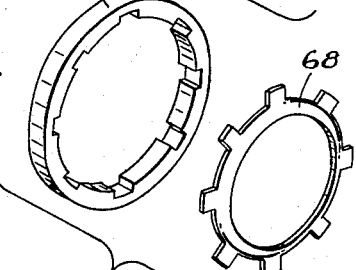

Dec. 17, 1963  J. E. BUXTON ETAL  3,114,270
STARTER DRIVE
Filed May 5, 1961  3 Sheets-Sheet 3
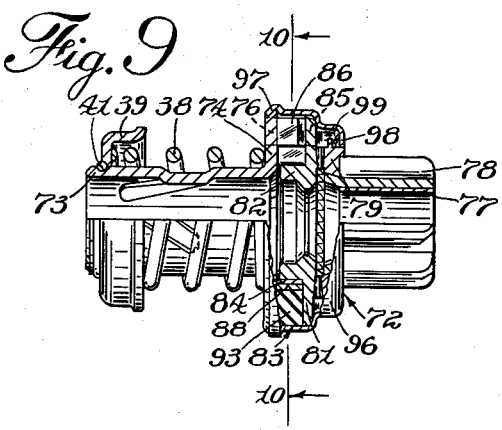
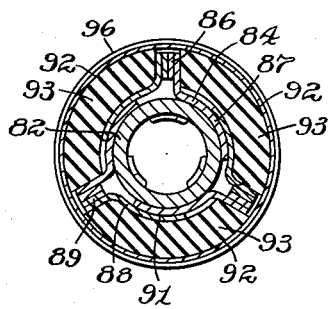
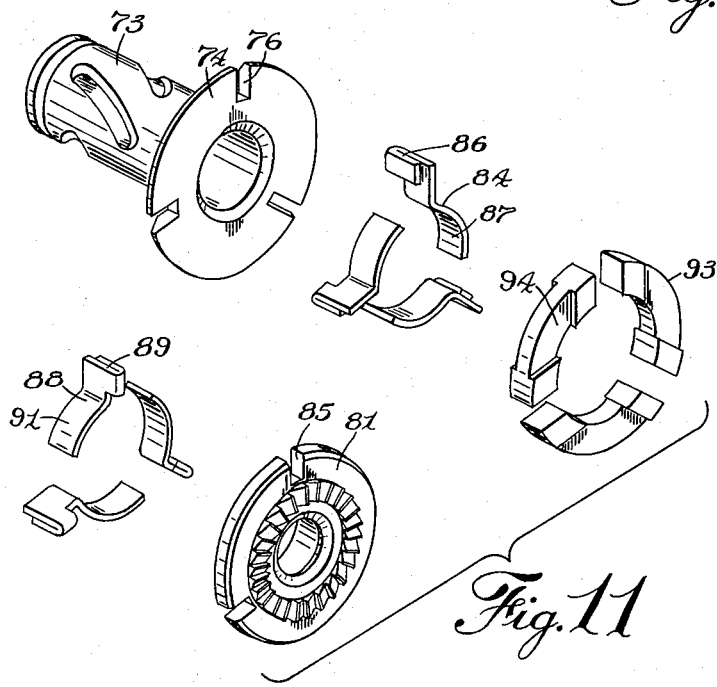
INVENTORS
James E. Buxton
John J. Sabatini
BY Edwin Elliott Hood
WITNESS:
Esther M. Stockton
ATTORNEY

United States Patent Office 3,114,270
Patented Dec. 17, 1963

3,114,270
STARTER DRIVE
James E. Buxton and Edwin Elliott Hood, Elmira, and John J. Sabatini, Horseheads, N.Y., assignors to The Bendix Corporation, Elmira, N.Y., a corporation of Delaware
Filed May 5, 1961, Ser. No. 108,112
14 Claims. (Cl. 74—6)

The present invention relates to a starter drive for internal combustion engines and more particularly relates to a drive of the positive shift variety incorporating therein dentiled overrunning clutch means and a flexible coupling adapted to normally transmit driving torque but capable of absorbing high peak starting torques.

It is an object of the present invention to provide a starter drive which is facile, efficient and economical. It is facile in that its construction does not require complicated structures; efficient in that its operation is dependable and measures up to very high standards established by engine manufacturers and economical in that it can be manufactured and fabricated at costs equal to or less than those of similar type starter drives presently in use.

It is another object of the invention to provide a starter drive of the positive shift type sold under the applicants' assignee registered trademark "Positork" which incorporates a dentiled overrunning clutch mechanism.

It is still another object of the invention to provide a positive shift drive which incorporates coupling means interposed between the drive sleeve and the driving clutch member which coupling means is not only capable of transmitting a high driving torque but which is capable of temporarily absorbing a high peak torque associated with the initiation of driving engagement between the starter drive and the engine to be started.

It is a further object of the invention to provide a starter drive coupling which comprises opposed flanges on the drive sleeve and the driving clutch member having opposed abutting lugs or coupling members which form arcuate voids into which are positioned elastically deformable arcuate segments with each of the segments being capable of transmitting and absorbing torque.

It is a further object of the invention to provide a starter drive having a coupling means utilizing opposed coupling members wherein the coupling members are separately formed articles which, when assembled, combine to provide a cavity with means for supporting arcuate elastically deformable connecting segments.

The invention further resides in certain novel features of construction, and combinations and arrangements of parts, and these further objects and advantages will be apparent to those skilled in the art to which it pertains from the following description of several embodiments thereof described with reference to the accompanying drawings in which similar reference characters represent corresponding parts throughout the several views, and in which:

FIGURE 1 is a side elevation view, partly in section, of a first embodiment of the invention;

FIGURE 2 is a sectional view of the coupling means incorporated in the starter drive illustrated in FIGURE 1 taken substantially on the plane of section line 2—2;

FIGURE 3 is an exploded detail perspective view of the flanged and lugged sleeve, the arcuate elastic coupling segments, the flanged and lugged driving clutch member and supporting cylindrical sleeve which combine to comprise a coupling means incorporated in the embodiment illustrated in FIGURE 1;

FIGURE 4 is a side elevation view similar to FIGURE 1, partly in section, illustrating a second embodiment of the invention;

FIGURE 5 is an exploded detail perspective view similar to FIGURE 3 of the flanged sleeve, the arcuate elastic coupling segments, a support bearing and the flanged and lugged driving clutch member, all of which combine to comprise the coupling means incorporated in the embodiment illustrated in FIGURE 4;

FIGURE 6 is a side elevation view similar to FIGURE 4, partly in section and broken away, illustrating a third embodiment of the invention;

FIGURE 7 is an exploded detail perspective view of the thrust washer members used in the embodiment of the invention illustrated in FIGURE 6;

FIGURE 8 is a sectional view of the embodiment illustrated in FIGURE 6 taken substantially on the plane of section line 8—8;

FIGURE 9 is a side elevation view, partly in section and broken away, illustrating a fourth embodiment of the invention;

FIGURE 10 is a sectional view of the embodiment illustrated in FIGURE 9 taken substantially on the plane of section line 10—10; and FIGURE 11 is an exploded detail perspective view, in twin line arrangement, of the flanged sleeve, the separate driving coupling members, the arcuate elastic coupling segments, the separate driven coupling members and the flanged driving clutch member.

Referring to FIGURE 1, there is illustrated a starter drive of the positive shift variety which has been generally designated 11. The drive is supported on a power shaft of a starting motor (not shown) by a drive sleeve 12 having formed helical splines 13 which engage helical grooves in the shaft. One extremity of the sleeve is flanged as at 14, with the flange integrally formed with the sleeve or being a separate member secured to the sleeve by any convenient method.

A pinion assembly is slidably journalled on a reduced diameter end portion of the power shaft and comprises a sleeve bushing 16, a pinion 17 and the flanged driven dentiled clutch member 18. A flanged dentiled drive clutch member 19 is also journalled on the power shaft. The clutch member's dentiled surfaces are complementary and provide an overrunning clutch connection therebetween. A clutch biasing spring 21 is interposed between the sleeve flange 14 and the driving clutch member 19 to exert an axial bias maintaining the clutch members normally drivingly engaged.

Coupling means, generally designated as 15, between the sleeve and the driving clutch member are provided to form a driving connection therebetween. The opposing faces of the sleeve flange and the flange of the driving clutch member 19 are provided with a like number of identical coupling members or lugs 22 and 23, respectively, circumferentially spaced about the marginal portions of the respective flanges. When assembled, the flanges form an annular void into which the lugs extend. One side of each of the opposing and paired lugs abut while the other sides of the lugs combine with the next adjacent pair of lugs to form a plurality of arcuate voids 26. A like plurality of arcuate segments 27 of an elastically deformable material, such as rubber, are positioned one in each void 26 and preferably have the ends thereof engaging the exposed sides of the lugs 22 and 23. When assembled in this manner, the segments will alternately engage a lug of the sleeve flange and a lug of the driving clutch member. Identical spring caps 28 engaging the ends of the clutch spring 21 are formed with axially extending rims which provide a support for the radially innermost surfaces of the segments and assist in maintaining the proper radial position of the segments relative to the flanged lugs.

A cylindrical sleeve 29 is supported on the sleeve flange and the flanges of the clutch members. Punctiform detents 31 extending radially inwardly from the cylindrical sleeve surface are formed adjacent one extremity of the sleeve adapted to engage the driving clutch flange and to limit its axial separation relative to the coupling means. A casing 32 is supported by the flanges to provide a housing for the coupling means and the clutch members. The edge portions of the casing are inturned as at 33 and 34 to engage the adjacent flanges. Preferably, the casing should be supported in such a manner as to be rotatably free relative to the coupling means, the clutch members and the pinion assembly.

The arcuate segments 27 are formed with a plurality of radial voids 36 to provide a softened coupling action. The voids 36 allow the segments to freely expand radially and axially when the couple is subjected to peak starting torques. The greater the number of voids the softer will be the coupling action. The segments are also tapered at the lug abutting extremities as at 37 to allow a compressive action to take place and to prevent the elastic material from mushrooming around and under the lugs where it would become chewed up, frayed and worn.

A mesh enforcing spring 38 concentrically encompassing the sleeve 12 is confined between the sleeve flange 14 and a shifting flange 39. A retainer ring 41 engages the shift flange to limit its axial displacement. A shifting fork (not shown) actuates the drive in a manner well known to those skilled in the art. This method of drive actuation is common to all the embodiments herein described.

In FIGURE 4, there is illustrated a second embodiment of the invention generally indicated as 42. The drive is supported on the armature shaft of a starting motor (not shown) by a sleeve 43 having a splined connection with the shaft. A radial flange 44 is formed on one extremity of the sleeve.

A pinion assembly is slidably journalled on the reduced diameter shaft assembly and comprises a pinion bushing 46, a pinion 47 and a flanged dentiled driven clutch member 48. A support bearing 49 is journalled on the shaft and bridges a shaft diameter reduction. A flanged dentiled driving clutch member 51 is in turn journalled on the support bearing with one of the clutch flange faces directly opposing the sleeve flange. The dentils of both clutch members are adapted to complement each other and to provide an overrunning clutch connection therebetween. The opposing flange faces form an annular void into which a like number of opposed identical coupling members or lugs 52 and 53 on the flange 44 and the clutch member 51, respectively, axially extend. The lugs, formed adjacent the marginal portions of the opposing flanges, are paired and have a face of each lug in abutting engagement. The other face of each of the lugs combines with an adjacent pair of lugs to form a plurality of arcuate voids. A plurality of arcuate elastically deformable segments 54 having radial voids formed therein and tapered at their extremities for the purposes previously described are disposed one in each of the arcuate voids and are supported by the support bearing 49. The tapered ends of the segments alternately engage the driving lugs 52 and the driven lugs 53 to provide a torque transmitting couple member between the sleeve 43 and clutch member 51.

The casing 56 having radially inturned edges 57 and 58 is rotatably supported by the flange 44 and the driving clutch member's flange. A spring cup 59 is supported within the casing between an offset portion 61 of the casing and the adjacent inturned edge 58. A thrust washer 62 fits within the spring cup and slidably engages the flange of the driving clutch member 51 to limit axial separation between the coupling which has been generally indicated as 60 and the driving clutch 51. The radially extending bottom wall 63 of the cup 59 is journalled on the driven clutch member 48. A beveled spring washer 64 is interposed between the wall 63 and the flange of the driven clutch 48 to yieldably exert a bias urging the driven clutch member into normal driven engagement with the driving clutch member 51. The spring 64 will yield to allow normal overrunning clutch separation to take place when the pinion is driven at a higher rate of speed than that of the driving components.

FIGURE 6 illustrates a third embodiment of the invention generally designated as 66. The embodiment 66 is substantially identical to that designated as 42, with the distinguishing features centering around the thrust washer arrangements utilized therein and best illustrated in FIGURES 7 and 8. The thrust washer 67 positioned in the spring cup 59 abutting the driving clutch member's flange is formed with a plurality of axial slots in its inner peripheral surface. A second thrust washer 68 having like plurality of radially extending splines adapted to engage the axial slots of the thrust washer 67 is journalled on the driven clutch member. The purpose of this arrangement is to prevent undue wear of the spring washer 69 which exerts a biasing force on the driven clutch member. The washer 68 is interposed between the flange of the driven clutch member 71 and the spring 69. There is sliding engagement between the clutch flange and the washer 68 but there is little or no relative movement which would cause wear occurring between the washer 68 and the bottom wall 63 of the spring cup 59, thus wearing of the spring is effectively controlled.

FIGURES 9, 10 and 11 illustrate still another embodiment of the invention which has been generally designated as 72. The drive is supported on the armature shaft of a starting motor (not shown) by a sleeve 73 having a splined connection with the shaft. A flange 74 is formed on or affixed to one extremity of the sleeve. Circumferentially spaced about the marginal portions of the flange are a plurality of slots 76.

A pinion assembly is supported on a reduced diameter portion of the shaft by a bushing 77 and comprises a pinion 78 and a flanged dentiled driven clutch member 79. A flanged dentiled driving clutch member 81 is journalled on the shaft. The dentils of the clutch members are complementary and adapted to provide a normal overrunning clutch connection for driving the pinion assembly. A hub 82 is formed on the driving clutch member and extends axially towards the flange 74. The opposing faces of the driving clutch member's flange and the sleeve flange 74 and the hub 82 form an annular void into which a coupling means generally designated as 83 is positioned. The driving clutch flange is provided with a plurality of circumferentially spaced slots 85 in its marginal portion with the number of slots being identical to the number of slots 76.

The coupling means 83 comprise a plurality of driving coupling members 84 positioned in the annular void. The coupling members 84 are formed with axially extending tongues 86 which engage in the slots 76. A curved tail portion 87 is provided on each coupling member adapted to slidably engage the hub 82. An equal number of driven coupling members 88 are positioned in the annular void. The coupling members 88 are also formed with axially extending tongues 89 adapted to engage the slots 85. A curved tail portion 91 similar to the tail portion 87 but having a somewhat shorter radial offset is provided on each coupling member 88 adapted to overlie the curved tail portion 87 of each of the coupling members 84 (see FIGURE 10).

The coupling members 84 and 88 are paired each having an abutting face. The opposite faces of the coupling members combine with the next adjacent pair of coupling members to define an arcuate void 92 into which are positioned elastically deformable arcuate segments 93, one segment being positioned in each of the voids 92. The segment ends compressively engage the coupling members with one end engaging the driving coupling member 84 and the other end engaging driven coupling member 88 to thereby provide a driving connection between the sleeve and the driving clutch member. The side walls of the segments 93 are formed with radial voids 94 to provide a softened coupling action hereinbefore described.

A casing 96 having inturned edge portions 97 and 98 is rotatably supported on the flange 74 and the driving clutch flange. A beveled spring washer 99 is positioned between the flange of the driven clutch member 79 and the adjacent casing edge 98 to exert a biasing force on the driven clutch member urging it into normal driven engagement with the clutch member 81. The spring 99 will permit the clutch members to overrun when the pinion is driven at a higher speed than that of the driving components.

In operation, the drive is urged toward a gear of the engine to be started by a shift fork (not shown) engaging the shift flange 39 and causing the entire drive to be axially displaced on its splined connection with the power shaft. Should tooth abutment occur between the teeth of the pinion and the gear of the engine, the mesh enforcing spring 38 will be compressed until such time as the starting motor has been energized. As soon as teeth become aligned, the spring will be somewhat released from its compression and will urge the pinion into complete mesh with the engine gear. A helical spline connection of the type illustrated in each of the embodiments will materially assist in obtaining more complete meshing action.

When the starting motor is initially energized, the clutch member will be engaged and the starting torque will be transferred from the shaft to the sleeve through the spline connection and from the sleeve through the coupling means to the clutch members and thence to the pinion where it will be transferred to the engine gear. Initially, the starter torque will be high and the engine, due to its inertia, will be reluctant to wholly accept all of the available starting torque. The peak starting torque is, to a degree, absorbed in the coupling means by compressing the arcuate segments between the adjacent driving and driven coupling members or lugs. Circumferential compression causes the segments to radially outwardly expand and to axially expand against the opposing faces of the flanges of the sleeve and the driving clutch member. Continued starting torque is transferred to the engine and as the starting inertia of the engine is overcome, the absorbed peak starting torque stored within the coupling is gradually dissipated into active starting torque applied to the engine allowing the coupling to return to substantially its normal condition.

When the engine has been successfully started, or if a false start should occur, then the pinion will be propelled by the engine at a higher rate of speed than the clutch members. The clutch member dentils will, as a consequence, be cammed apart and the pinion assembly will be allowed to overrun without detrimentally affecting the starter motor or other starter drive components. In the case of a false or abortive start when the pinion speed returns to the speed of the starter motor, the clutch members again will be biased into engagement and the starting torque will be applied again to the engine. The release of the starting motor from starting duties during overrun will allow the starting motor to accelerate during its free running speed so that when the driving relation is again established between the clutch members, it will be necessary that some of the peak starting torque associated with the increased free running motor speed be absorbed and stored. The coupling means thus again functions as a peak torque absorber and as the engine again approaches the starting motor speed, this absorbed torque will be gradually released to assist the starter motor in its propelling functions.

It is to be understood that the invention is not limited in its application to the details of construction and arrangement of parts of the several preferred embodiments illustrated in the accompanying drawings since the invention is capable of other embodiments and of being practiced and carried out in various ways. Also, it is to be understood that the phraseology or terminology employed herein is for the purpose of description and not of limitation, and it is not intended to limit the invention herein claimed beyond the requirements of the prior art.

We claim:

1. A positive shift type engine starter drive comprising: a flanged sleeve adapted for connection to a power shaft and movable thereon toward and away from a gear of the engine to be started; a flanged driving clutch member slidably journalled on the shaft, said flanges being axially separated; complementing means supported on said flanges extending into said axial separation adapted to form a plurality of arcuate voids; a like plurality of elastically deformable arcuate segments supported in said voids engaging said complementing means; a pinion slidably journalled on the shaft for movement into and out of mesh with the gear of an engine to be started including a driven clutch member operatively connected to the pinion; means for maintaining said clutch members normally drivingly engaged but permitting the driven clutch member to freely overrun.

2. A positive shift type engine starter drive adapted for connection to a power shaft comprising: a movable sleeve including a radial flange at one extremity splined to the shaft; a pinion slidably journalled on the shaft for movement into and out of mesh with a gear of an engine to be started; overrunning clutch means including a driven clutch member secured to the pinion and a driving clutch member journalled on the shaft for transmitting torque to the pinion, said driving clutch member including a radial flange having a face opposing the sleeve flange; coupling means intermediate the opposing faces of the sleeve flange and driving clutch flange including a plurality of elastically deformable arcuate segments and including further a plurality of like coupling members spaced about and supported on each of the opposing flange faces in equal numbers for transmitting torque from the sleeve to the overrunning clutch, said coupling members adapted to have one side of each opposing coupling member in abutting engagement and defining an arcuate void adjacent the other side of said coupling members adapted to receive said elastic segments; casing means supported by the sleeve flange providing a housing for the coupling means and the overrunning clutch means; means for maintaining the overrunning clutch members normally drivingly engaged but permitting the driven clutch member to freely overrun; and, means supported on the sleeve for actuating the sleeve relative to the power shaft.

3. A positive shift type engine starter drive as set forth in claim 2 in which the spline connection between the sleeve and the shaft comprises: a radially inwardly formed helical detent adapted to complement a helical groove in the power shaft and further, in which the overrunning clutch means comprise opposing complementing dentiled faces on said clutch members adapted to establish a driving connection therebetween for transmitting starting torque to the pinion and allowing the driving connection to be disestablished when the pinion is driven by the gear of the engine at a speed greater than that of the power shaft.

4. A positive shift type engine starter drive as set forth in claim 2 in which the elastically deformable arcuate segments of the coupling means include a radially opening void formed in each of the radial side walls of each segment, said segments being adapted to circumferentially completely fill the arcuate void between said coupling members.

5. A positive shift type engine starter drive as set forth in claim 2 in which the casing means supported by the sleeve is frely rotatable relative to the sleeve and to the clutch means and includes radially inturned edge portions.

6. A positive shift type engine starter drive as set forth in claim 5 including further cylindrical sleeve means supported on the periphery of the sleeve flange and the periphery of the flange of the driving clutch member in coaxial alignment with the power shaft having its extremity slidably engaging the casing inturned edge portions; and, detent means formed in the cylindrical sleeve adapted to engage the driving clutch member flange for maintaining the engagement of the coupling means and the driving clutch member.

7. A positive shift type engine starter drive as set forth in claim 5 in which the means for maintaining the clutch members normally engaged includes a flange formed on the driven clutch member within the housing and spring means cooperating with said driven clutch flange and the adjacent casing inturned edge portion.

8. A positive shift type engine starter drive as set forth in claim 5 in which the means for maintaining the clutch members normally engaged includes a flange formed on the driven clutch member within the housing, an annular thrust washer supported in the housing concentrically mounted relative to the driven clutch member, said thrust washer having a plurality of extending slots opening radially inwardly, a splined washer member supported on the driven clutch member having a plurality of radially extending lugs adapted to engage the slot openings of the thrust washer, one of which is positioned in each of said slots, a cup-shaped member having a cylindrical wall supported on the periphery of the thrust washer and having an offset apertured bottom wall abutting the adjacent casing inturned edge adapted to be journalled on the driven clutch member and spring means supported on the driven clutch member interposed between the splined washer and said bottom wall of the cup-shaped member and cooperating therewith for maintaining the splined washer in engagement with the driven clutch flange and urging the clutch members into normal driving engagement.

9. A positive shift type engine starter drive as set forth in claim 2 in which each of said flanges includes a like plurality of radial slots extending inwardly from the marginal portions of said flanges, and in which the coupling members are characterized by a radial body portion, an axial tongue extending from the radial body adjacent its outer edge adapted to engage in one of said flange slots and a substantially arcuate tail member extending from the radial body inner edge, said arcuate tail members of each of the opposing and abutting coupling member adapted to extend in opposite circumferential directions to lap the tail member of the circumferentially adjacent coupling member to define in each arcuate void a support for the elastically deformable segments.

10. A positive shift type engine starter drive adapted for connection to a power shaft comprising: a movable sleeve including a radial flange at one extremity helically splined to the shaft; a pinion slidably journalled on the shaft for movement into and out of mesh with a gear of an engine to be started; dentiled overrunning clutch means including a driven clutch member secured to the pinion and a driving clutch member journalled on the shaft for transmitting torque to the pinion, said clutch members including radial flanges; coupling means intermediate the opposing faces of the sleeve flange and the driving clutch flange including a plurality of elastically deformable arcuate segments and further including a plurality of like radially disposed lugs circumferentially spaced about each of said opposing flange faces in equal numbers for transmitting torque from the sleeve to the overrunning clutch, said lugs adapted to have one side of each lug in abutting engagement and defining an arcuate void adjacent the other side of said lugs adapted to receive said elastic segments; cylindrical sleeve means supported on the outer periphery of said flanges having detents formed therein adapted to engage the driving clutch flange for maintaining the driving clutch member and coupling means in engagement; casing means supported on the cylindrical sleeve having radially inturned edges engaging the sleeve flange and driven clutch flange providing a housing for the overrunning clutch and coupling means limiting axial separation between said clutch members; and, a coil spring disposed about the shaft intermediate the opposed faces of the sleeve flange and the driven clutch flange urging the clutch members into driving engagement but permitting them to freely overrun.

11. A positive shift type engine starter drive adapted for connection to a power shaft comprising: a movable sleeve including a radial flange at one extremity helically splined to the shaft; a pinion slidably journalled on the shaft for movement into and out of mesh with a gear of the engine to be started; overrunning clutch means including a flanged driven clutch member secured to the pinion and a flanged driving clutch member, said driving clutch member having a flanged face opposing the sleeve flange defining an annular cavity; bearing means journalled on the shaft within the cavity for supporting the driving clutch member parallel to the flanged driven clutch member; coupling means disposed in said annular cavity including a plurality of elastically deformable arcuate segments and a plurality of like radially disposed lugs circumferentially spaced about and supported on each of said opposing flange faces in equal numbers for transmitting torque to the clutch means, said lugs adapted to have one side of each opposing lug in abutting engagement and defining an arcuate void adjacent the other side of said lugs adapted to receive said elastic segments; casing means supported by the sleeve flange including radially inturned edge portions providing a housing for the coupling and clutch means; means including a cap member journalled on the driven clutch and engaging an edge portion of the casing and including further a spring member compressively engaging the driven clutch flange and cap member for maintaining the clutch members normally drivingly engaged; and, a thrust washer supported by the said cap member engaging the drive clutch flange for maintaining the driving clutch member and coupling means in engagement.

12. A positive shift type engine starter drive adapted for connection to a power shaft comprising: a movable sleeve including a radial flange at one extremity helically splined to the shaft; a pinion slidably journalled on the shaft for movement into and out of mesh with a gear of the engine to be started; overrunning clutch means including a flanged driven clutch member secured to the pinion and a flanged driving clutch member, said driving clutch member having a flanged face opposing the sleeve flange defining an annular cavity; a bearing journalled on the shaft within the cavity supporting the driving clutch member; coupling means disposed in said annular cavity including a plurality of elastically deformable arcuate segments and a plurality of like radially disposed lugs circumferentially spaced about and supported on each of said opposing flange faces in equal numbers for transmitting torque to the clutch means, said lugs adapted to have one side of each opposing lug in abutting engagement and defining an arcuate void adjacent the other side of said lugs adapted to receive said elastic segments; casing means supported by the sleeve flange including radially inturned edge portions providing a housing for the coupling and clutch means; a cup-shaped cap member journalled on the driven clutch member and engaging an edge portion of the casing; a first thrust washer supported in said cap including a plurality of radially inwardly opening axial splines for maintaining the driving clutch member and coupling means engaged; a second thrust washer supported on the driven clutch member; said second thrust washer including a like plurality of radially outwardly extending lugs adapted to slidably engage the axial spline of said first thrust washer; and, a spring member compressively interposed between said cap and said second thrust washer for maintaining the clutch members normally engaged.

13. A positive shift type engine starter drive adapted for connection to a power shaft comprising: a movable sleeve including a radial flange at one extremity helically splined to the shaft, said flange marginal portion being provided with a plurality of circumferentially spaced slots; a pinion slidably journalled on the shaft for movement into and out of mesh with a gear of an engine to be started; overrunning clutch means including a flanged driven clutch member secured to the pinion and a driving clutch member journalled on the shaft, said driving clutch member including a radial flange having a plurality of circumferentially spaced marginal slots and having a face opposing the sleeve flange defining an annular cavity and including further an axial hub portion extending between said opposing faces; coupling means disposed in said annular cavity including a plurality of elastically deformable arcuate segments and including further a plurality of like coupling members spaced about and supported on each of said opposing flange faces in equal numbers for transmitting torque from the sleeve to the overrunning clutch, said coupling members adapted to have one face of each opposing coupling member in abutting engagement and the other face of said coupling member with the next circumferential adjacent coupling member defining an arcuate void adapted to receive said arcuate segments, said coupling members being characterized by having an axial tongue extending therefrom adapted to engage one of the slotted flanges and having a substantially arcuate tail portion extending therefrom, said arcuate tail portion of each opposing and abutting coupling member adapted to extend in opposite circumferential directions and to lap the tail portion of the next circumferentially adjacent tail portion and to be supported on the driving clutch hub; casing means supported on the sleeve flange including inturned edge portions providing a housing for the clutch and coupling means; and, spring means engaging the driven clutch flange and an inturned portion of said casing for urging the driven clutch member into engagement with the driving clutch member.

14. A positive shift type engine starter drive as set forth in claim 2 in which the coupling members are characterized as radially disposed lugs circumferentially spaced about the opposing flange faces.

References Cited in the file of this patent

UNITED STATES PATENTS

| | | |
|---|---|---|
| 2,244,220 | Schauer | June 3, 1941 |
| 2,815,669 | Mendenhall | Dec. 10, 1957 |
| 2,828,630 | Digby | Apr. 1, 1958 |
| 2,933,926 | Buxton et al. | Apr. 26, 1960 |
| 2,944,428 | Antonidis et al. | July 12, 1960 |